(12) United States Patent
Bodin et al.

(10) Patent No.: US 6,925,471 B2
(45) Date of Patent: Aug. 2, 2005

(54) DETECTING INTERACTIONS VIA INTELLIGENT GATEWAY

(75) Inventors: William Kress Bodin, Austin, TX (US); Derral Charles Thorson, Austin, TX (US); Parag Himanshu Shah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 09/935,398

(22) Filed: Aug. 23, 2001

(65) Prior Publication Data

US 2003/0038172 A1 Feb. 27, 2003

(51) Int. Cl.[7] .............................................. G06F 17/30
(52) U.S. Cl. ............. 707/103; 235/462.01; 235/462.02; 235/462.25; 235/472.02; 235/487; 707/10
(58) Field of Search ................................ 707/102, 101, 707/103, 10, 1; 235/462.01, 385, 375, 472.02, 462.25, 462.45; 340/572.1, 573.3

(56) References Cited

U.S. PATENT DOCUMENTS

| | | | |
|---|---|---|---|
| 5,745,754 A | 4/1998 | Lagarde et al. ............. 395/615 |
| 5,751,909 A | 5/1998 | Gower ......................... 395/11 |
| 5,796,950 A | 8/1998 | Sips et al. .................. 395/200 |
| 5,845,264 A | 12/1998 | Nellhaus ....................... 705/28 |
| 5,918,053 A | 6/1999 | Graham ...................... 395/704 |
| 6,094,655 A | 7/2000 | Rogers et al. ................ 707/10 |
| 6,128,620 A | 10/2000 | Pissanos et al. ............. 707/102 |
| 6,173,404 B1 | 1/2001 | Colburn et al. .............. 713/200 |
| 6,188,570 B1 | 2/2001 | Borkowski ................... 361/683 |
| 6,192,364 B1 | 2/2001 | Baclawski .................... 707/10 |
| 6,232,870 B1 * | 5/2001 | Garber et al. ............... 340/10.1 |
| 6,259,367 B1 * | 7/2001 | Klein ....................... 340/572.1 |
| 6,342,839 B1 * | 1/2002 | Curkendall et al. ....... 340/573.3 |
| 6,491,217 B2 * | 12/2002 | Catan .......................... 235/375 |
| 6,526,158 B1 * | 2/2003 | Goldberg .................... 382/115 |
| 6,616,047 B2 * | 9/2003 | Catan ..................... 235/472.02 |
| 6,664,897 B2 * | 12/2003 | Pape et al. ................ 340/573.3 |
| 6,676,014 B2 * | 1/2004 | Catan .......................... 235/375 |
| 6,732,933 B2 * | 5/2004 | Waxelbaum ........... 235/462.25 |
| 6,758,397 B2 * | 7/2004 | Catan .......................... 235/385 |

* cited by examiner

Primary Examiner—Jean M. Corrielus
(74) Attorney, Agent, or Firm—John Biggers; Mark S. Walker; Biggers & Ohnian, LLP

(57) ABSTRACT

A method of detecting interactions among objects associated with RFID tags implemented in computer software operating in a services gateway, the services gateway including server software installed and operating upon a computer. The method includes reading, through an RFID reader, a first RFID identification code from a first RFID tag associated with a first object; reading a second RFID identification code from a second RFID tag associated with a second object; and inferring from an interactions database an interaction between the objects. The interactions database includes an interactions record representing the interaction between the objects, the interactions record comprising an interaction identification field having a value identifying the interaction between the objects and at least two RFID identification fields. The readings of RFID identification codes and the inferring of an interaction are carried out through Java servlets in an OSGI-compliant service bundle installed and operating in the service gateway.

45 Claims, 3 Drawing Sheets

| Interaction Records | | |
|---|---|---|
| RFID ID Fields | Interaction ID Fields | Risk Level |
| 12354 | 10001 | Low |
| 34565 | 10001 | Low |
| 567 | 10099 | Low |
| 789 | 10099 | Low |
| 321 | 10099 | Low |
| 2345 | 10002 | High |
| 7656 | 10002 | High |
| 7890 | 10002 | High |
| 765 | 10002 | High |
| 654345 | 10002 | High |
| 567 | 50017 | Low |
| 5687 | 50017 | Low |
| 8 | 50017 | Low |
| 456 | 22089 | Moderate |
| 45 | 22089 | Moderate |

FIG. 3

DETECTING INTERACTIONS VIA INTELLIGENT GATEWAY

BACKGROUND OF THE INVENTION

1. Field of the Invention

The field of the invention is detecting interactions among objects, or more specifically, dynamic methods and means for detecting interactions among objects.

2. Description of the Related Art

Bar code readers provide to computers data identifying objects bearing bar codes. Objects bearing bar codes must be in close physical proximity to a bar code reader, must be correctly oriented in space with respect to the bar code reader, and must be physically moved across the scanning element of the bar code reader. Only one bar code at a time can be scanned by a bar code reader. Bar code readers and the computers and databases to which bar code readers are coupled typically provide no information whatsoever regarding physical interactions among objects. It would be advantageous, therefore, to have methods and systems that identify objects and interactions among objects, many objects at approximately the same time, regardless of the exact physical orientation of the objects with respect to a reader.

SUMMARY OF THE INVENTION

Typical embodiments of the invention include methods of detecting interactions among objects associated with RFID tags implemented in computer software operating in a services gateway. In typical embodiments, the services gateway includes server software installed and operating upon a computer. Typical embodiments include reading, through an RFID reader, a first RFID identification code from a first RFID tag associated with a first object; reading, through the RFID reader, a second RFID identification code from a second RFID tag associated with a second object; and inferring from an interactions database an interaction between the objects. In typical embodiments, the interactions database includes an interactions record representing the interaction between the objects, the interactions record including an interaction identification field having a value identifying the interaction between the objects and at least two RFID identification fields. In typical embodiments, the readings of RFID identification codes and the inferring of an interaction are carried out through Java servlets in an OSGI-compliant service bundle installed and operating in the service gateway.

In typical embodiments of the invention inferring an interaction includes finding in the interactions database an interaction record having a first interaction field value equal to the first RFID identification code and a second interaction field value equal to the second RFID identification code. In typical embodiments, the interactions database includes a remote database installed and operating upon a computer located remotely from the services gateway and the services gateway is coupled for data communications to the interactions database. Typically, the interactions database includes a local database installed and operating upon the computer upon which the service gateway is installed, and the services gateway is coupled for data communications to the interactions database.

Typical embodiments of the invention also include evaluating the inferred interaction in dependence upon risk level and communicating the inferred interaction to a person. Typical embodiments further include evaluating the inferred interaction in dependence upon risk level and communicating the evaluated inferred interaction to a person. In typical embodiments, the first object includes a prescription bottle for a first drug and the second object includes a prescription bottle for a second drug Typical embodiments of the invention also include creating in the interactions database the interaction data record, wherein the interaction data record comprises an interaction identification field having a value; and storing, on the RFID tags, the value of the interaction identification field. Typical embodiments further include reading the RFID identification codes from the RFID tags; and storing the RFID identification codes in the RFID identification fields in the interaction data record.

Typical embodiments of the invention further include receiving an interaction identification value from a source of interaction identification values, wherein the source of interaction identification values is a cash register in a fast food restaurant. In typical embodiments, inferring an interaction is carried out in dependence upon a known interaction identification value.

The foregoing and other objects, features and advantages of the invention will be apparent from the following more particular description of exemplary embodiments of the invention, as illustrated in the accompanying drawings wherein like reference numbers represent like parts of the invention.

BRIEF DESCRIPTION OF THE DRAWINGS

FIG. 3 is an example of data structures useful with various exemplary embodiments of the present invention to represent interactions among objects.

DETAILED DESCRIPTION OF EXEMPLARY EMBODIMENTS

Introduction

Figure 1:
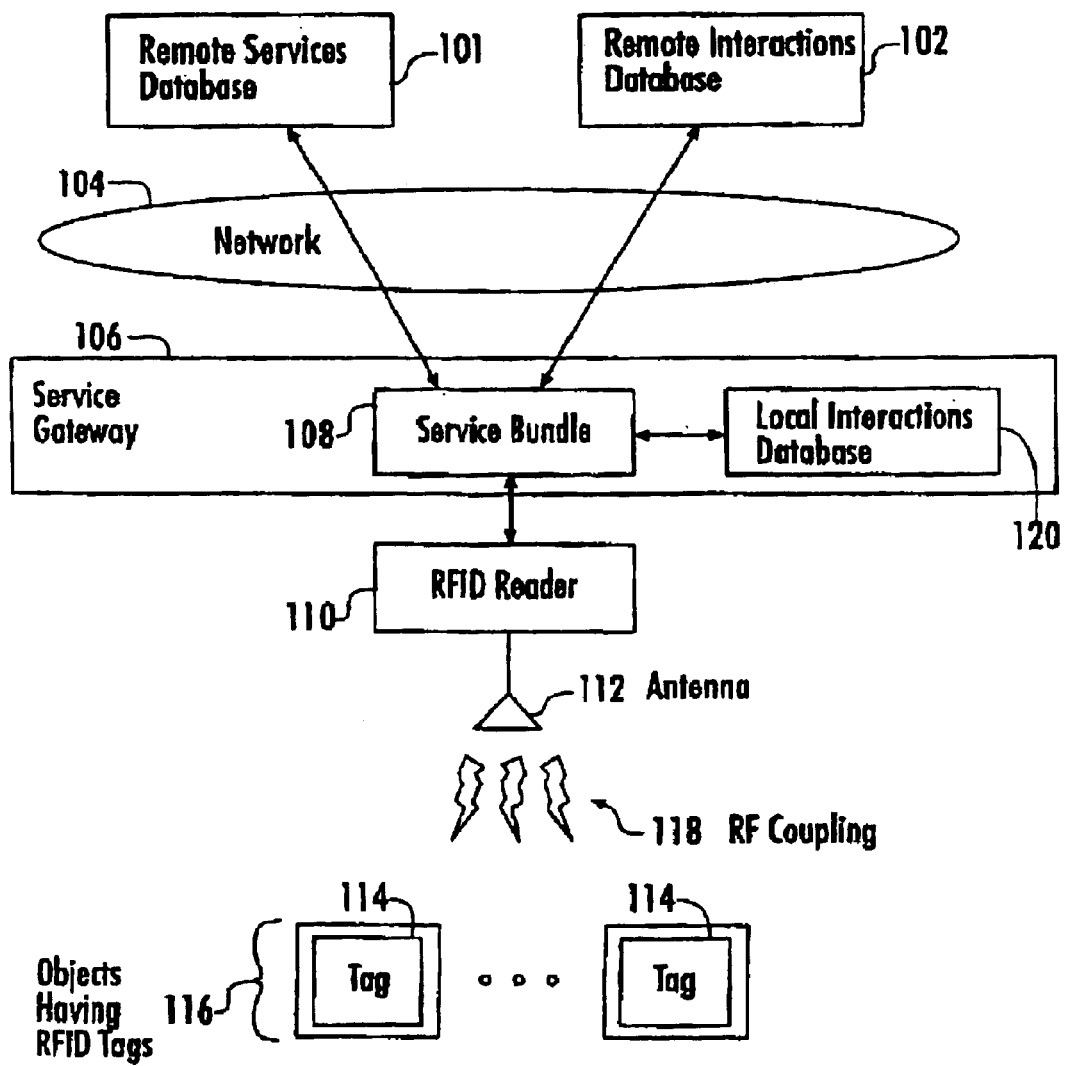
FIG. 1 is a block diagram illustrating example embodiments of systems for detecting interactions among objects associated with RFID tags.

The present invention is described primarily in terms of methods for detecting interactions among objects, or more specifically, dynamic methods and means for detecting interactions among objects. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machinereadable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DEFINITIONS

In this specification, the following terms are used as defined here. Other terms are defined elsewhere in the specification and used as defined.

In this specification, the terms "field," "data element," "attribute," and "code" are used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects."

"Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of data communications as will occur to those of skill in the art.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling among service gateways, RFID readers, local interactions databases, and remote interactions databases coupled through designated network addresses is well within the scope of the present invention.

"Network address" means any network address useful to locate an RFID reader, a service gateway, a local interactions database, or a remote interactions database on any network. Network addresses include any internet protocol address useful to locate a service gateway, an RFID reader, or a remote interactions database on an internet. Network addresses useful with various embodiments of the invention include local internet protocol addresses, private internet protocol addresses, and temporary Internet addresses assigned to a Web client by a DHCP server, and permanent, official registered Internet addresses associated with domain names.

"URL" means Uniform Resource Locator, a standard method of associating World Wide Web data locations with network addresses for data communications.

"World Wide Web," or more simply "the Web," refers to the well-known system of internet protocol ("IP") servers that support specially formatted documents, documents formatted in a language called "HTML" for HyperText Markup Language. The term "Web" is used in this specification also to refer to any server or connected group or interconnected groups of servers that implement the HyperText Transport Protocol, "HTTP," in support of URLs and HTML documents, regardless whether such servers or groups of servers are coupled to the World Wide Web as such.

"Browser" means a Web browser, a software application for locating and displaying Web pages. Typical browsers today can display text, graphics, audio and video.

A "Web site" is a location on the World Wide Web. Web sites are identified by domain names that resolve to Internet addresses. Web sites include storage locations identifiable by URLs. Web sites are implemented in, on, and as part of Web servers, that is, HTTP servers. Web sites are aggregations of computer software installed and operating on computer hardware.

DETAILED DESCRIPTION

Turning now to FIG. 1, a first embodiment of the invention is shown as a system for detecting interactions among objects associated with RFID tags. "RFID" means Radio Frequency Identification, a technology for identifying objects by use of an antenna, a transceiver, and a transponder. RFID transceivers, in this specification, are referred to as "RFID readers." As the term 'transceiver' implies, however, RFID readers both read and write information to and from RFID transponders. RFID transponders are referred to in this specification as "RFID tags." RFID tags are programmed with RFID identification codes unique to each RFID tag. In addition, RFID tags are programmed in some embodiments with other information in addition to RFID identification codes, such as, for example, project codes, manufacturing kitting codes, or order numbers.

In typical embodiments, an RFID antenna (112) emits radio signals (118) to activate an RFID tag (114) and read and write data to and from the tag Antennas act as data conduits, part of a coupling for data communications, between tags and transceivers or RFID readers. Antennas are available in a variety of shapes and sizes. Antennas in some embodiments are built into door frames to receive tag data from objects passing through doors or mounted on interstate toll booths to monitor traffic passing by on a freeway. In some embodiments, where multiple tags are expected continually, the electromagnetic field produced by an antenna is constantly present. If constant interrogation is not required, the field in many embodiments is activated by sensors.

Often an antenna (112) is packaged with an RFID reader (110), which is configured in various embodiments as a handheld or as a fixed-mount device. An RFID reader (110) in typical embodiments emits radio waves in ranges of anywhere from one inch to 100 feet or more, depending upon its power output and the radio frequency used. When an RFID tag (114) passes through the electromagnetic field of a radio signal from an RFID antenna, the RFID tag detects the reader's activation signal. The reader decodes the data encoded in the tag's integrated circuit (silicon chip) and the data is passed to a service gateway (106) for processing.

In the system as illustrated in FIG. 1, the service gateway (106) is a host server, server software installed and running on server computer hardware. In many embodiments, the service gateway is a home or business server, a separate computer coupled for data communications through a network to an RFID reader. In typical embodiments, the services gateway is an embedded server inserted in a network to connect the external internet to internal client devices within a home, office, or business setting. Client devices include RFID readers. In some embodiments, the service gateway is an embedded server installed and running in the same physical device or cabinet with the RFID reader.

"Embedded servers" typically are Java embedded servers, small-footprint application serves that can be embedded in any networked device, such as a home gateway, automobile, vending machine, cash register, gas pump, or RFID reader. Embedded servers typically are zero-administration devices intended, when implemented as service gateways, to divide a network architecture into an external network and an internal network. An embedded server manages service deployed from trusted external resources to internal client devices over a network, including for example, services implemented through OSGI-compliant service bundles. Embedded servers enable deployment and installation of services, such as OSGI-compliant service bundles, on a just-in-time basis, when the services are needed from time to time for use by client devices, such as, for example, RFID readers.

"OSGI" refers to the Open Services Gateway Initiative, an industry organization developing specifications for service gateways, including specifications for delivery of service bundles, software middleware providing compliant data communications and services through service gateways. The Open Services Gateway specification is a java based application layer framework that give service providers, network operator device makers, and appliance manufacturer's vendor neutral application and device layer APIs and functions. An "API" is an Application Program Interface, a set of routines, protocols, and tools for building software applications.

RFID tags come in a wide variety of shapes and sizes. Animal tracking tags, inserted beneath the skin, can be as small as a pencil lead in diameter and one-half inch in length. Some tags are screw-shaped to identify trees or wooden items, or credit-card shaped for use in access applications. The anti-theft hard plastic tags attached to merchandise in stores are RFID tags. In addition, heavy-duty 5- by 4- by 2-inch rectangular transponders used to track intermodal containers or heavy machinery, trucks, and railroad cars for maintenance and tracking applications are RFID tags.

RFID tags are categorized as either active or passive. Active RFID tags are powered by an internal battery and are typically read/write, i.e., tag data can be rewritten and/or modified. An active tag's memory size varies according to application requirements; some systems operate with up to 1 MB of memory. In a typical read/write RFID work-in-process system, a tag might give a machine a set of instructions, and the machine would then report its performance to the tag. This encoded data would then become part of the tagged part's history. The battery-supplied power of an active tag generally gives it a longer read range. The trade off is greater size, greater cost, and a limited operational life (which may yield a maximum of 10 years, depending upon operating temperatures and battery type).

Passive RFID tags operate without a separate external power source and obtain operating power generated from the RFID reader. Passive tags are consequently much lighter than active tags, less expensive, and offer a very long operational lifetime. The trade off is that passive RFID tags have shorter read ranges than active tags and require a higher-powered reader. Some passive are programmed with a unique set of data (usually 32 to 128 bits) that cannot be modified. Read-only tags most often operate as a license plate or index into a database, in the same way as linear barcodes reference a database containing modifiable product-specific information.

The RFID tags in the embodiment of FIG. 1 are said to be "associated" with objects (116), by which is meant a close physical proximity. The RFID tags may or may not be physically attached to the objects, as, for example, the case of drugs in which pills are stored in a pill container where the container rather than the pills has the RFID tag affixed, although the pills are considered the objects of interest.

In the system according to FIG. 1, the interactions databases (102, 120) are repositories of data records identifying relationships called "interactions" among objects. The databases support interactions by relating RFID identification codes to data element values identifying or describing interactions among objects, the objects being identified by close proximity to an RFID tag. In some embodiments, an interactions database is a remote interactions database (102) from which interactions are downloaded from across a network (104). In other embodiments, an interactions database is a local interactions database (102) installed upon the same computer with the services gateway (108). Just as data identifying or representing interactions is downloaded across a network in some applications, similarly, in some applications, the service bundles themselves also are downloaded to the service gateway (108) from a remote services database (101) installed on a remote computer and coupled for data communications to the service gateway (106) through a network (104).

Figure 2:
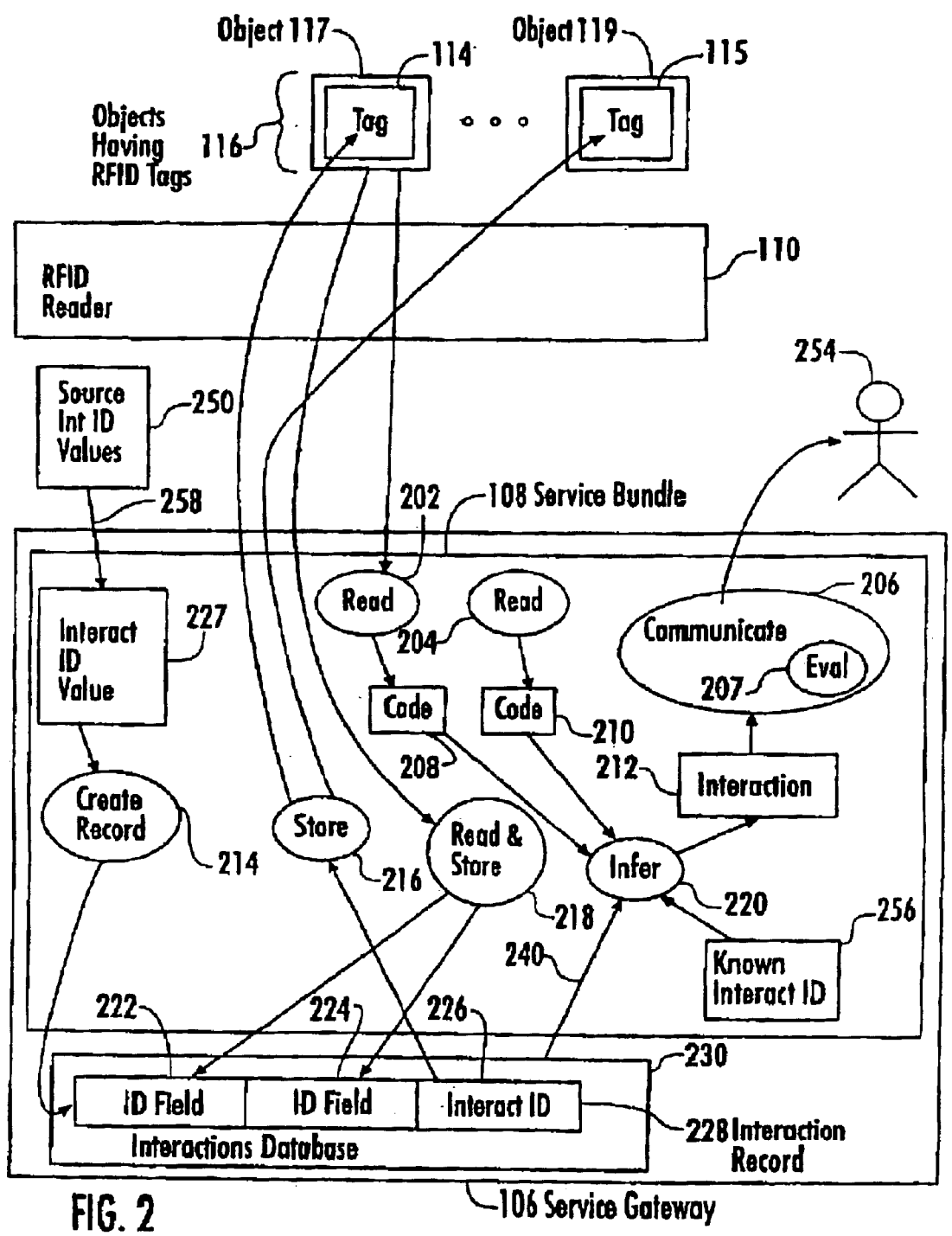
FIG. 2 is a control flow diagram illustrating example embodiments of methods for detecting interactions among objects associated with RFID tags.

Turning now to FIG. 2, a more detailed example embodiment of the invention is seen as a method of detecting interactions among objects associated with RFID tags, the method implemented in computer software operating in a services gateway, the services gateway comprising server software installed and operating upon a computer. The illustrated example embodiment of FIG. 2 includes reading (202), through an RFID reader (110), a first RFID identification code (208) from a first RFID tag (114) associated with a first object (117). The embodiment of FIG. 2 also includes reading (204), through the RFID reader (110), a second RFID identification code (210) from a second RFID tag (115) associated with a second object (119). The embodiment of FIG. 2 further includes inferring (220) from an interactions database (230) an interaction (212) between the objects (117, 119). In the example embodiment of FIG. 2, the interactions database (230) comprises an interactions record (228) representing the interaction between the objects, the interactions record comprising an interaction identification field (226) having a value identifying the interaction between the objects and at least two RFID identification fields (222, 224). In the example embodiment shown in FIG. 2, the readings (202, 204) of RFID identification codes (208, 210) and the inferring (220) of an interaction (212) are carried out through Java servlets in an OSGI-compliant service bundle (108) installed and operating in the service gateway (106).

In example embodiments of the kind shown in FIG. 2, inferring (220) an interaction (212) further comprises finding (240) in an interactions database (230) an interaction record (228) having a first interaction field (222) value equal to the first RFID identification code (208) from the first RFID tag (114) and a second interaction field value (224) equal to the second RFID identification code (210) from the second RFID tag(115).

In some embodiments, the interactions database comprises a remote database (as illustrated at reference 102 on FIG. 1) installed and operating upon a computer located remotely from the services gateway (106) and the services gateway is coupled for data communications through a network (reference 104 on FIG. 1) to the interactions database. In other embodiments, the interactions database comprises a local database (reference 120 on FIG. 1 and reference 230 on FIG. 2) installed and operating upon the computer upon which the service gateway (106) is installed, and the services gateway is coupled for data communications to the interactions database.

In a further category of embodiments of the invention, the first object (reference 117 on FIG. 2) comprises a prescription bottle or packaging material for a first drug and the second object (119) comprises a prescription bottle or packaging material for a second drug. There are many example embodiments of the category in which the objects associated with RFID tags are prescription bottles or packaging material for drugs.

Such embodiments typically include communicating to a person or user (254) inferred interactions (212) among objects. In addition, to the extent that risk levels are indicated in interaction records (as at reference 308 on FIG. 3), such embodiments often include evaluating (207) the inferred interaction in dependence upon risk level and then communicating (206) the evaluated inferred interaction to a person (254).

In some embodiments, for example, the RFID reader (110) is installed in a home drug cabinet that includes a service gateway implemented as an embedded server in the drug cabinet itself along with an audio interface for communicating (206) inferred interactions (212) to a person (254) using the drug cabinet. In some examples of this kind of embodiment, the drug cabinet, upon inferring a risky interaction, will speak to the person using the drug cabinet to warn of possible harmful interaction among drugs placed in the drug cabinet.

An example of an interaction inferred as risky is shown at FIG. 3, reference (312), as including five interaction records identified by interaction identification field (306) values of "10002." These five interaction records identify an interaction among object associated with the five RFID tags identified by RFID identification field (304) values of "2345," "7656," "7890," "765," and "654345." It is an advantage of the present invention to so easily identify interactions among so many objects. In fact, although the examples illustrated on FIG. 2 tend to discuss two objects and two RFID tags, there is, within the invention itself, no practical limitation on the number of objects or RFID tags that can be associated with a particular interaction.

Persons of skill in the art will notice that there is no text description field illustrated in FIG. 2 or FIG. 3 for interactions. In some embodiments, the interaction records themselves are simply expanded to include text descriptions of interactions. In other embodiments, descriptive text fields are included in separate records related to the interaction records through a foreign key such as the interaction identification field value (306 on FIG. 3, 226 on FIG. 2). The data structures and database structures just described are useful to describe interactions and support inference of interactions in dependence upon RFID tag codes and known interaction identification field values. Many data structures and database structures useful for such purposes will occur to those of skill in the art, and all of them are well within the scope of the present invention.

More detail regarding this kind of embodiments is shown in FIG. 3 where interaction records (302) are illustrated as including at least one field indicating risk level (308). Again with reference to FIG. 2, such embodiments typically include also, in their communications functions (206), a capability of evaluating (207) inferred interactions, including, for example, risk levels, and changing communications to users (254) in dependence upon interaction risk levels.

Turning again to FIG. 2, a further embodiment of the invention is illustrated as including creating (214) in an interactions database (230) an interaction data record (228), wherein the interaction data record (228) comprises an interaction identification field (226) having a value (227). This more detailed example embodiment includes storing (216), on the RFID tags (114, 115), the value (227) of the interaction identification field (226); reading (218) the RFID identification codes from the RFID tags (114, 115); and storing (218) the RFID identification codes in the RFID identification fields (222, 224) in the interaction data record (228). The more detailed embodiment includes receiving (258) an interaction identification value (227) from a source of interaction identification values (250). In some embodiments of this kind, the source of interaction identification values (250) is a cash register in a fast food restaurant. In the example of a fast food restaurant, a cash register provides an order number to serve as the interaction identification field value, and food packages have affixed to them RFID tags to which are written through an RFID reader at order time, the order number for a customer's order. Interaction records are created bearing the RFID tag codes for packaging material for each item of food ordered, and, when the order is prepared and placed in a paper bag for handing to the customer, the order is placed near an RFID reader antenna, and scanned for data off the RFID tags in the paper bag. In typical embodiments, the order number on the RFID tag on the paper bag is treated as a known interaction identification (256) for use in inferring an interaction among the food items in food packages in the bag. In this kind of example embodiment, the inference function is programmed to use the known interaction identification (256) to find all the interaction records created at order, and therefore having upon them the order number in their interaction identification fields, and compare the interaction records created at order time with the codes read from the food items in the bag to infer whether the order is complete.

Whether the order is complete is the inferred interaction (212) for this kind of embodiment. Persons of skill in art will immediately recognize that embodiments of this kind include any application where remote sensing of interactions among aggregations of objects is desirable, including for example, kitting applications in manufacturing operations; checking completeness of surgical tool sets in hospital operating rooms; inferences whether, when a person leaves the person's home, walking past an RFID antenna in a garage door, the person is carrying the person's keys, wallet, and briefcase; and inferences whether upon leaving a person's home, the person is wearing socks of the same color. Many more examples of applications of remote sensing of interactions among aggregations of objects will occur to those of skill in the art, and all such applications are well within the scope of the present invention.

As will be seen from this discussion just above, in some embodiments of the kind illustrated at FIG. 2, the first object (117) is a first article of manufacture in a manufacturing assembly and the second object (119) is a second article of manufacture in the manufacturing assembly. In other embodiments of the kind illustrated, the first object (117) is a first container for a first fast food item and the second object (119) is a second container for a second fast food item. More specifically, in other embodiments of the kind illustrated, the first object (117) is a paper wrapper for a cheeseburger and the second object (119) is a plastic cup for a soft drink. In other embodiments of the kind illustrated, the first object (117) is a first navy blue sock and the second object (119) is a second navy blue sock. In other embodiments of the kind illustrated, the first object (117) is a scalpel and the second object (119) is a surgical clamp.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of detecting interactions among objects associated with RFID tags, the method implemented in computer software operating in a services gateway, the services gateway comprising server software installed and operating upon a computer, the method comprising the steps of:
   reading, through an RFID reader, a first RFID identification code from a first RFID tag associated with a first object;
   reading, through the RFID reader, a second RFID identification code from a second RFID tag associated with a second object; and
   inferring from an interactions database an interaction between the objects;
   wherein the interactions database comprises an interactions record representing the interaction between the objects, the interactions record comprising an interaction identification field having a value identifying the interaction between the objects and at least two RFID identification fields; and
   wherein the readings of RFID identification codes and the inferring of an interaction are carried out through Java servlets in an OSGI-compliant service bundle installed and operating in the service gateway.

2. The method of claim 1 wherein inferring an interaction further comprises finding in the interactions database an interaction record having a first interaction field value equal to the first RFID identification code and a second interaction field value equal to the second RFID identification code.

3. The method of claim 1 wherein the interactions database comprises a remote database installed and operating upon a computer located remotely from the services gateway and the services gateway is coupled for data communications to the interactions database.

4. The method of claim 1 wherein the interactions database comprises a local database installed and operating upon the computer upon which the service gateway is installed, and the services gateway is coupled for data communications to the interactions database.

5. The method of claim 1 further comprising evaluating the inferred interaction in dependence upon risk level.

6. The method of claim 1 further comprising communicating the inferred interaction to a person.

7. The method of claim 1 further comprising evaluating the inferred interaction in dependence upon risk level and communicating the evaluated inferred interaction to a person.

8. The method of claim 1 wherein the first object comprises a prescription bottle for a first drug and the second object comprises a prescription bottle for a second drug.

9. The method of claim 1 comprising the further steps of:
   creating in the interactions database the interaction data record, wherein the interaction data record comprises an interaction identification field having a value;
   storing, on the RFID tags, the value of the interaction identification field;
   reading the RFID identification codes from the RFID tags; and
   storing the RFID identification codes in the RFID identification fields in the interaction data record.

10. The method of claim 9 further comprising receiving an interaction identification value from a source of interaction identification values.

11. The method of claim 10 wherein the source of interaction identification values is a cash register in a fast food restaurant.

12. The method of claim 9 wherein inferring an interaction is carried out in dependence upon a known interaction identification value.

13. The method of claim 9 wherein the first object is a first article of manufacture in a manufacturing assembly and the second object is a second article of manufacture in the manufacturing assembly.

14. The method of claim 9 wherein the first object is a first container for a first fast food item and the second object is a second container for a second fast food item.

15. The method of claim 9 wherein the first object is a paper wrapper for a cheeseburger and the second object is a plastic cup for a soft drink.

16. A system for detecting interactions among objects associated with RFID tags, the system implemented in computer software operating in a services gateway, the services gateway comprising server software installed and operating upon a computer, the system comprising:
   means for reading, through an RFID reader, a first RFID identification code from a first RFID tag associated with a first object;
   means for reading, through the RFID reader, a second RFID identification code from a second RFID tag associated with a second object; and
   means for inferring from an interactions database an interaction between the objects;
   wherein the interactions database comprises an interactions record representing the interaction between the objects, the interactions record comprising an interaction identification field having a value identifying the interaction between the objects and at least two RFID identification fields; and
   wherein the readings of RFID identification codes and the inferring of an interaction are carried out through Java servlets in an OSGI-compliant service bundle installed and operating in the service gateway.

17. The system of claim 16 wherein means for inferring an interaction further comprises means for finding in the interactions database an interaction record having a first interaction field value equal to the first RFID identification code and a second interaction field value equal to the second RFID identification code.

18. The system of claim 16 wherein the interactions database comprises a remote database installed and operating upon a computer located remotely from the services gateway and the services gateway is coupled for data communications to the interactions database.

19. The system of claim 16 wherein the interactions database comprises a local database installed and operating upon the computer upon which the service gateway is installed, and the services gateway is coupled for data communications to the interactions database.

20. The system of claim 16 further comprising means for evaluating the inferred interaction in dependence upon risk level.

21. The system of claim 16 further comprising means for communicating the inferred interaction to a person.

22. The system of claim 16 further comprising means for evaluating the inferred interaction in dependence upon risk level and means for communicating the evaluated inferred interaction to a person.

23. The system of claim 16 wherein the first object comprises a prescription bottle for a first drug and the second object comprises a prescription bottle for a second drug.

24. The system of claim 16 further comprising:
   means for creating in the interactions database the interaction data record, wherein the interaction data record comprises an interaction identification field having a value;
   means for storing, on the RFID tags, the value of the interaction identification field;
   means for reading the RFID identification codes from the RFID tags; and
   means for storing the RFID identification codes in the RFID identification fields in the interaction data record.

25. The system of claim 24 further comprising means for receiving an interaction identification value from a source of interaction identification values.

26. The system of claim 25 wherein the source of interaction identification values is a cash register in a fast food restaurant.

27. The system of claim 24 wherein means for inferring an interaction is carried out in dependence upon a known interaction identification value.

28. The system of claim 24 wherein the first object is a first article of manufacture in a manufacturing assembly and the second object is a second article of manufacture in the manufacturing assembly.

29. The system of claim 24 wherein the first object is a first container for a first fast food item and the second object is a second container for a second fast food item.

30. The system of claim 24 wherein the first object is a paper wrapper for a cheeseburger and the second object is a plastic cup for a soft drink.

31. A computer program product for detecting interactions among objects associated with RFID tags, the computer program product implemented in computer software operating in a services gateway, the services gateway comprising server software installed and operating upon a computer, the computer program product comprising:
   a recording medium;
   means, recorded on the recording medium, for reading, through an RFID reader, a first RFID identification code from a first RFID tag associated with a first object;
   means, recorded on the recording medium, for reading, through the RFID reader, a second RFID identification code from a second RFID tag associated with a second object; and
   means, recorded on the recording medium, for inferring from an interactions database an interaction between the objects;
   wherein the interactions database comprises an interactions record representing the interaction between the objects, the interactions record comprising an interaction identification field having a value identifying the interaction between the objects and at least two RFID identification fields; and
   wherein the readings of RFID identification codes and the inferring of an interaction are carried out through Java servlets in an OSGI-compliant service bundle installed and operating in the service gateway.

32. The computer program product of claim 31 wherein means, recorded on the recording medium, for inferring an interaction further comprises means, recorded on the recording medium, for finding in the interactions database an interaction record having a first interaction field value equal to the first RFID identification code and a second interaction field value equal to the second RFID identification code.

33. The computer program product of claim 31 wherein the interactions database comprises a remote database installed and operating upon a computer located remotely from the services gateway and the services gateway is coupled for data communications to the interactions database.

34. The computer program product of claim 31 wherein the interactions database comprises a local database installed and operating upon the computer upon which the service gateway is installed, and the services gateway is coupled for data communications to the interactions database.

35. The computer program product of claim 31 further comprising means, recorded on the recording medium, for evaluating the inferred interaction in dependence upon risk level.

36. The computer program product of claim 31 further comprising means, recorded on the recording medium, for communicating the inferred interaction to a person.

37. The computer program product of claim 31 further comprising means, recorded on the recording medium, for evaluating the inferred interaction in dependence upon risk level and means for communicating the evaluated inferred interaction to a person.

38. The computer program product of claim 31 wherein the first object comprises a prescription bottle for a first drug and the second object comprises a prescription bottle for a second drug.

39. The computer program product of claim 31 further comprising:
   means, recorded on the recording medium, for creating in the interactions database the interaction data record, wherein the interaction data record comprises an interaction identification field having a value;
   means, recorded on the recording medium, for storing, on the RFID tags, the value of the interaction identification field;
   means, recorded on the recording medium, for reading the RFID identification codes from the RFID tags; and
   means, recorded on the recording medium, for storing the RFID identification codes in the RFID identification fields in the interaction data record.

40. The computer program product of claim 39 further comprising means, recorded on the recording medium, for receiving an interaction identification value from a source of interaction identification values.

41. The computer program product of claim 40 wherein the source of interaction identification values is a cash register in a fast food restaurant.

42. The computer program product of claim 39 wherein means, recorded on the recording medium, for inferring an interaction is carried out in dependence upon a known interaction identification value.

43. The computer program product of claim 39 wherein the first object is a first article of manufacture in a manufacturing assembly and the second object is a second article of manufacture in the manufacturing assembly.

44. The computer program product of claim 39 wherein the first object is a first container for a first fast food item and the second object is a second container for a second fast food item.

45. The computer program product of claim 39 wherein the first object is a paper wrapper for a cheeseburger and the second object is a plastic cup for a soft drink.

* * * * *